United States Patent
Dede et al.

(10) Patent No.: US 12,278,404 B2
(45) Date of Patent: Apr. 15, 2025

(54) FUEL CELL BIPOLAR PLATE FLOW FIELD HAVING HYBRID INTERWOVEN CHANNEL PATTERN

(71) Applicant: Toyota Motor Engineering & Manufacturing North America, Inc, Plano, TX (US)

(72) Inventors: Ercan M. Dede, Ann Arbor, MI (US); Yuqing Zhou, Ann Arbor, MI (US); Danny J. Lohan, Northville, MI (US); Feng Zhou, Ann Arbor, MI (US); Tomoki Tambo, Ann Arbor, MI (US); Hiroshi Ukegawa, South Lyon, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 299 days.

(21) Appl. No.: 17/475,492

(22) Filed: Sep. 15, 2021

(65) Prior Publication Data
US 2023/0082620 A1  Mar. 16, 2023

(51) Int. Cl.
*H01M 8/026* (2016.01)
*H01M 8/0258* (2016.01)
(Continued)

(52) U.S. Cl.
CPC ......... *H01M 8/026* (2013.01); *H01M 8/0258* (2013.01); *H01M 8/0265* (2013.01); *H01M 2008/1095* (2013.01)

(58) Field of Classification Search
None
See application file for complete search history.

(56) References Cited

U.S. PATENT DOCUMENTS

2005/0221152 A1* 10/2005 Turpin .................... H01M 4/96
204/278
2008/0070080 A1* 3/2008 Miyazaki ............ H01M 8/0263
429/492
(Continued)

FOREIGN PATENT DOCUMENTS

CN  110993985 A  4/2020

OTHER PUBLICATIONS

Guo et al., Bio-Inspired Design of Bipolar Plate Flow Fields for Polymer Electrolyte Membrane Fuel Cells, Missouri University of Science and Technology, Aug. 10, 2011, pp. 607-623 (Year: 2011).*

(Continued)

*Primary Examiner* — Ula C Ruddock
*Assistant Examiner* — Mary Grace Byram
(74) *Attorney, Agent, or Firm* — Jordan IP Law, LLC

(57) ABSTRACT

A bipolar plate for a fuel cell, a fuel cell, and a method of designing a bipolar plate for a fuel cell having a hybrid flow field structure that includes a plurality of parallel feed flow channels fluidically connected to an inlet bipolar plate region, a plurality of parallel exit flow channels fluidically connected to an outlet bipolar plate region, and an interwoven pattern formed by a plurality of simplified periodic array flow field structure generated based on flow patterns generated by homogenized anisotropic porous media optimization. The flow field structure enhances fuel cell performance by facilitating lower pressure drop via minimized fluid flow resistance, and removal of accumulated water in the oxygen channel and the gas diffusion layer (GDL) under the ribs of the bipolar plate.

10 Claims, 5 Drawing Sheets

(51) Int. Cl.
H01M 8/0265 (2016.01)
H01M 8/10 (2016.01)

(56) References Cited

U.S. PATENT DOCUMENTS

2009/0136823 A1* 5/2009 Kusakabe ........... H01M 8/1007
429/434
2020/0266453 A1 8/2020 Dede et al.
2021/0064715 A1 3/2021 Dede et al.

OTHER PUBLICATIONS

Kahraman, H. et al., "A Different Flow Field Design Approach for Performance Improvement of a PEMFC", Acta Physica Polonica A, 2017, 3 pages.
Sauermoser, Marco et al., "Flow Field Patterns for Proton Exchange Membrane Fuel Cells", Frontiers in Energy Research, Feb. 19, 2020, 20 pages.

* cited by examiner

FUEL CELL BIPOLAR PLATE FLOW FIELD HAVING HYBRID INTERWOVEN CHANNEL PATTERN

TECHNICAL FIELD

Embodiments relate generally to one or more flow field structures for a fuel cell (FC) bipolar plate that include a plurality of hybrid interwoven channel flow patterns, generated by topology optimization, of varying sizes and flow orientations. Such flow field structures facilitate enhanced oxygen distribution under the rib of the FC bipolar plate into the fuel cell gas diffusion layer (GDL), and also facilitate the removal of accumulated water in the oxygen channel.

BACKGROUND

Conventional FC bipolar plate designs often utilize serpentine, parallel, or interdigitated channel layouts. Serpentine channel designs are known to have high pressure drop with relatively low reaction variation, while parallel channel designs often have much lower pressure drop yet higher reaction variation from fluid species inlet to outlet.

An FC bipolar plate design having interdigitated flow fields creates flow channels that are generally not continuous from the inlet to the outlet. Because the flow channels are non-continuous between fluid flow inlet to flow outlet, the fluid flow is forced under pressure to flow through a porous GDL layer and catalyst layer in order to reach adjacent flow channels fluidically connected to the outlet. Although this design removes water effectively from the electrode structure, all the flow and generated water upstream of the flow field are forced to flow through the porous electrode layer, which may result in high flow pressure drop and channel flooding.

Moreover, some conventional FC bipolar plate designs, such as those having straight channels, have ribs that abut or otherwise contact the GDL. The GDL under the ribs is susceptible to water accumulation or saturation (i.e., flooding), which adversely affects $O_2$ diffusion and causes non-uniform power generation.

BRIEF SUMMARY

To address the aforementioned limitations, one or more embodiments set forth, described, and/or illustrated herein present one or more flow field structures for an FC bipolar plate having a hybrid channel design that employ parallel channel design characteristics in combination with enhanced interdigitated channel design characteristics that thereby yield enhanced operational performance benefits in terms of fluid flow resistance and reaction uniformity. Use of such hybrid channel designs also have a continuous flow path from the plate inlet to the plate outlet that facilitates clearance of accumulated water during FC operation.

In accordance with one or more embodiments, a FC bipolar plate has a hybrid channel design that includes a plurality of parallel channels at the plate inlet bipolar plate region, a plurality of parallel channels at the bipolar plate outlet region, and a flow field structure at the reaction region that comprises continuous flow path interwoven channels. The interwoven channels comprise a plurality of primary flow channels or arteries fluidically connected to a plurality of secondary flow channels or capillaries that are fluidically connected to parallel channels at the inlet bipolar plate region and the outlet bipolar plate region. Some of the secondary channels may merge into a single primary channel to generate a greater flow rate through the primary flow channel than a flow rate of the parallel channels fluidically connected to the inlet bipolar plate region and the outlet bipolar plate region. The ratio of the various channel sizes, widths, lengths, and/or orientations may be optimized to balance the flow resistance, the flow distribution, and the gas diffusion under the channel wall/rib into the GDL.

Based on implementation of optimized flow channels that minimizes fluid flow resistance and maximizes reaction uniformity, the interwoven channel designs may have different weave patterns to yield enhanced operational performance of the FC bipolar plate. The interwoven channel design facilitates continuous fluid flow from the plate inlet region to the plate outlet region while also facilitating gas diffusion into the GDL.

Such flow field structures are designed, in accordance with one or more embodiments, by applying topology optimization to generate flow patterns that facilitate greater uniform power generation via reaction uniformity across the FC bipolar plate. The flow field patterns also facilitate lower pressure drop via minimized fluid flow resistance across the FC bipolar plate, and removal of accumulated water in the oxygen channel and the gas diffusion layer (GDL) under the ribs of the FC bipolar plate.

In accordance with one or more embodiments, one or more example flow field structures are generated based on flow field optimization. The flow field structures comprise a plurality of interwoven patterns of varying channel sizes, widths, and/or orientation that are fluidically connected to the inlet bipolar plate region and the outlet bipolar plate region to map a flow field generated by topology optimization.

In accordance with one or more embodiments, a bipolar plate for a fuel cell comprises a bipolar plate body having an inlet bipolar plate region, an outlet bipolar plate region, and a simplified periodic array flow field structure comprising a plurality of parallel feed flow channels fluidically connected to the inlet bipolar plate region, a plurality of parallel exit flow channels fluidically connected to the outlet bipolar plate region, and an interwoven pattern flow field structure formed by a plurality of flow channel arrays fluidically connected to the feed flow channels and the exit flow channels, the interwoven pattern flow field structure having a structure based on flow patterns generated by homogenized anisotropic porous media optimization.

In accordance with one or more embodiments, a bipolar plate fuel cell comprises a multi-layer electrolyte structure interposed between a pair of bipolar plates, each fuel cell bipolar plate comprising a bipolar plate body having an inlet bipolar plate region, an outlet bipolar plate region, and a simplified periodic array flow field structure comprising a plurality of parallel feed flow channels fluidically connected to the inlet bipolar plate region, a plurality of parallel exit flow channels fluidically connected to the outlet bipolar plate region, and an interwoven pattern flow field structure formed by a plurality of flow channel arrays fluidically connected to the feed flow channels and the exit flow channels, the interwoven pattern flow field structure having a structure based on flow patterns generated by homogenized anisotropic porous media optimization.

In accordance with one or more embodiments, a method of designing a fluid flow field for a bipolar plate of a fuel cell comprises: optimizing, by one or more computing devices having one or more processors, homogenized anisotropic porous media by iteratively executing a gradient-based algorithm that incorporates objective functions of reaction variation and flow resistance; dehomogenizing the anisotropic porous media into an optimized flow field channel structure; and generating, based on the optimized and dehomogenized anisotropic porous media, a simplified periodic array flow field structure for a bipolar plate body comprising a plurality of parallel feed flow channels fluidically connected to an inlet bipolar plate region, a plurality of parallel exit flow channels fluidically connected to an outlet bipolar plate region, and an interwoven pattern formed by a plurality of flow channel arrays fluidically connected to the feed flow channels and the exit flow channels.

In accordance with one or more embodiments, the hybrid channel design is configured such that a bias of the flow of fuel and, particularly, the oxidizer is constrained to achieve a pressure distribution that causes infusion of oxidant into the membrane and water to an unrestricted channel for removal.

BRIEF DESCRIPTION OF THE SEVERAL VIEWS OF THE DRAWINGS

The various advantages of the one or more embodiments will become apparent to one skilled in the art by reading the following specification and appended claims, and by referencing the following drawings, in which:

DETAILED DESCRIPTION

Figure 1:
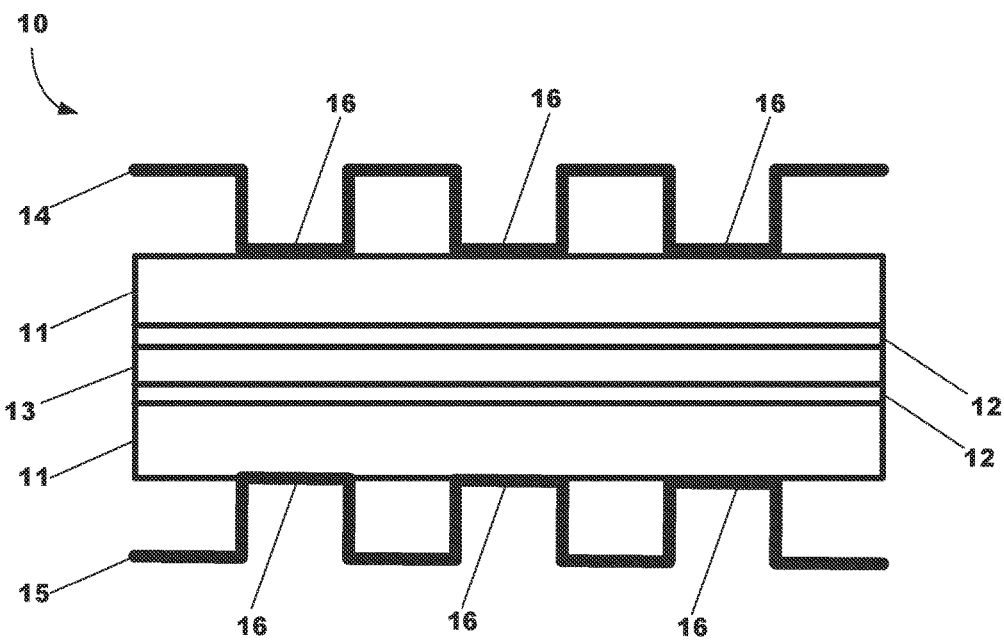
FIG. 1 illustrates a cross-section configuration of an FC, in accordance with one or more embodiments shown and described herein.

In the illustrated cross-section example embodiment of FIG. 1, a fuel cell (FC) 10 comprises a multi-layer electrolyte structure that includes a pair of gas diffusion layers (GDL) 11, a pair of catalyst layers 12, and a membrane 13 interposed between a pair of bipolar plates 14, 15 serving as electrodes. The bipolar plates 14, 15 have flow channel flow ribs 16 that when in a stacked formation of the air layer and the hydrogen layer of FC cells 10, define a channel through which a coolant flows.

Figure 2:
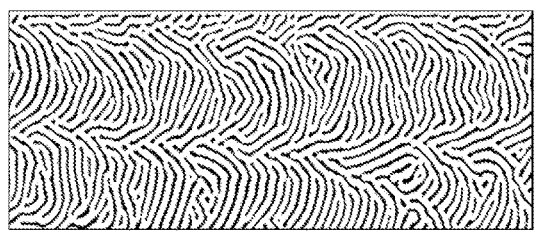
FIG. 2 illustrates an example flow field generated by homogenized anisotropic porous media optimization, in accordance with one or more embodiments shown and described herein.
Figure 3:
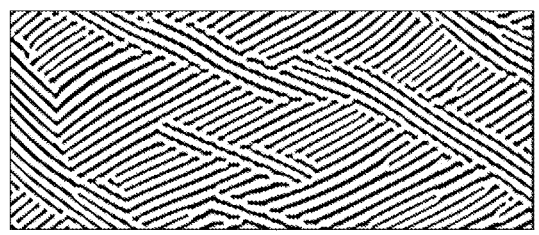
FIG. 3 illustrates an example flow field generated by homogenized anisotropic porous media optimization, in accordance with one or more embodiments shown and described herein.
Figure 4A:
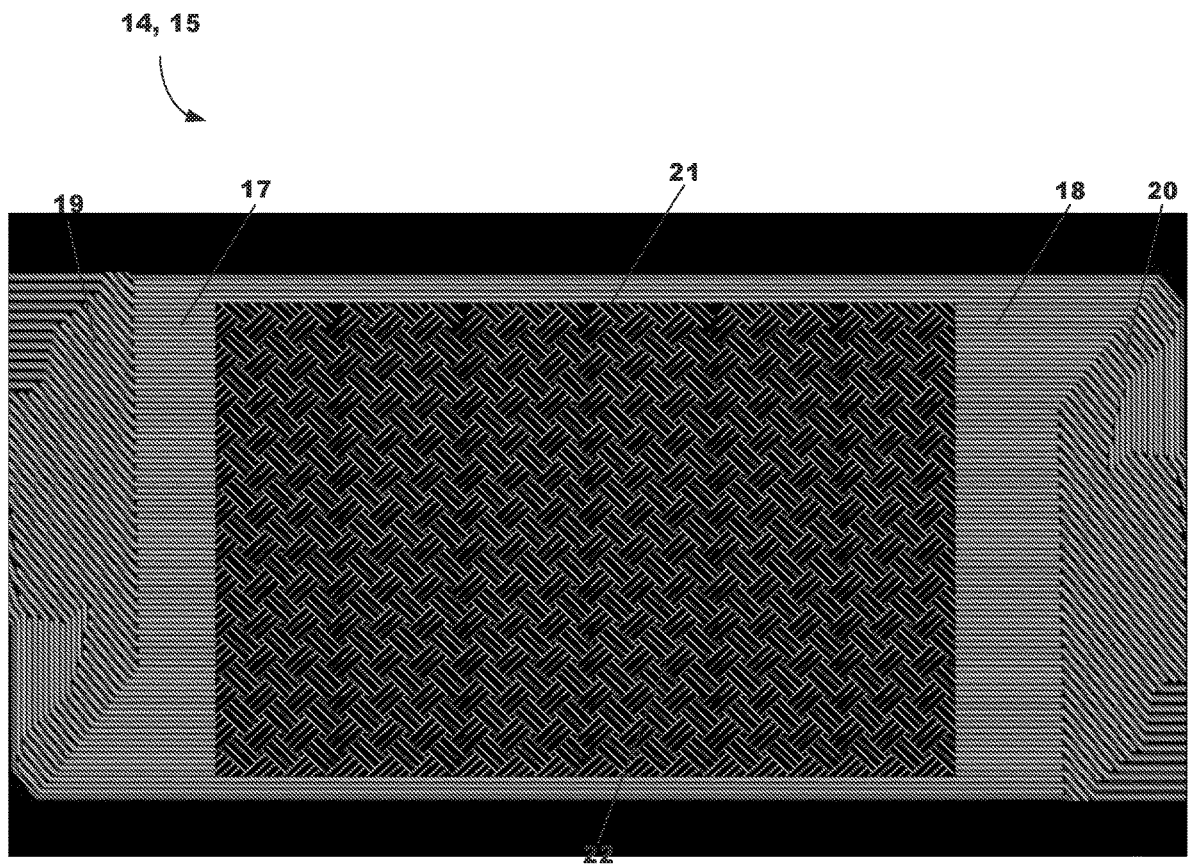
FIGS. 4A and 4B illustrate a flow field structure comprising an interwoven pattern defined by a plurality of intersecting flow channel arrays, in accordance with one or more embodiments shown and described herein.
Figure 4B:
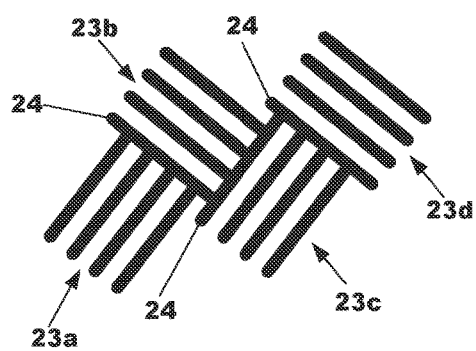
Figure 5:
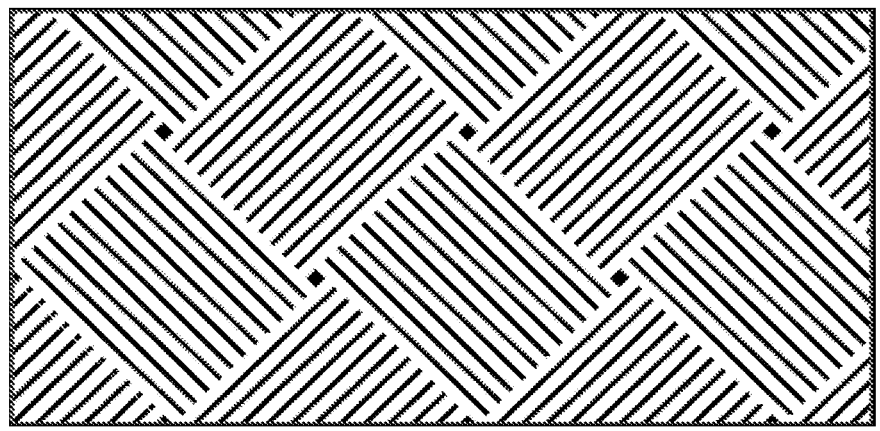
FIG. 5 illustrates an example interwoven pattern, in accordance with one or more embodiments shown and described herein.

In the illustrated example embodiment of FIGS. 4A, 4B, and 5 the active surface of each bipolar plate 14, 15 have a flow field structure based on flow patterns generated by homogenized anisotropic porous media optimization (see, for example, FIGS. 2 and 3). The flow field structure employs a hybrid structural design that comprises a plurality of parallel feed flow channels 17 fluidically connected to an inlet bipolar plate region 19, a plurality of parallel exit flow channels 18 fluidically connected to an outlet bipolar plate region 20, and an interwoven pattern 21 (FIG. 5) at a reaction region 21 formed by a plurality of flow channel arrays fluidically connected to the feed flow channels 17 and the exit flow channels 18. Arrangement of the parallel feed flow channels 17 and the parallel exit flow channels 18 facilitate fluid flow resistance at the inlet bipolar plate region 19 and the outlet bipolar plate region 20, while the interwoven pattern 22 of flow channel arrays facilitate gas distribution into the GDL 11 and additionally maintain a continuous fluid flow path to promote the removal of condensed water.

In the illustrated example of FIG. 4B, the flow channel array includes a plurality of fluidically-connected secondary flow channels 23a, 23b, 23c, 23d that intersect to define a plurality of primary flow channels 24 that facilitates a continuous flow path from the inlet bipolar plate region 19 to the outlet bipolar plate region 20. This interwoven pattern 22 has a structure based on flow pattern structures generated by homogenized anisotropic porous media optimization to enhance overall reaction performance (i.e., enhanced reaction uniformity though the FC 10) and fluid flow performance (i.e., reduced fluid flow resistance though the FC 10).

The interwoven pattern 22 is defined by a plurality of fluidically connected flow channel arrays. For example, each array comprises a first flow channel subarray that includes a first plurality of parallel secondary flow channels 23a (formed by linear ribs 16 (see FIG. 1)) that are spaced apart and intersect a second plurality of parallel secondary flow channels 23b (formed by linear ribs 16 (see FIG. 1)) that are spaced apart. A second flow channel subarray comprises a third plurality of parallel spaced apart secondary flow channels 23c that are spaced apart and intersect a fourth plurality of parallel secondary flow channels 23d that are spaced apart and intersect an adjacent flow channel subarray. In the illustrated example, the first plurality of parallel secondary flow channels 23a and the third plurality of parallel secondary flow channels 23c are positioned to be parallel to one another and at least a portion of the first plurality of parallel secondary flow channels 23a is directly adjacent to the third plurality of parallel secondary flow channels 23c. In the illustrated example, the second plurality of parallel secondary flow channels 23b and the fourth plurality of parallel secondary flow channels 23d are positioned to be parallel to one another and at least a portion of the second plurality of parallel secondary flow channels 23b is directly adjacent to the fourth plurality of parallel secondary flow channels 23d. In the illustrated example, the first plurality of parallel secondary flow channels 23a are located to be offset laterally and longitudinally with respect to the third plurality of parallel secondary flow channels 23c. Similarly, the second plurality of parallel secondary flow channels 23b are located to be offset laterally and longitudinally with respect to the fourth plurality of parallel secondary flow channels 23d.

The first plurality of secondary flow channels 23a have a first flow orientation while the second plurality of secondary flow channels 23b have a second flow orientation that is different than the first flow orientation to intersect the first plurality of secondary flow channels 23a at a predetermined angle. Likewise, the third plurality of secondary flow channels 23c have a third flow orientation while the fourth plurality of secondary flow channels 23d have a fourth flow orientation that is different than the third flow orientation to intersect the third plurality of secondary flow channels 23c at a predetermined angle. In accordance with one or more embodiments, the predetermined angle is approximately a right angle, i.e., approximately 90 degrees. In accordance with one or more embodiments, the predetermined angle is approximately an acute angle, i.e., approximately less than 90 degrees. In accordance with one or more embodiments, the predetermined angle is approximately an obtuse angle, i.e., approximately greater than 90 degrees.

In accordance with one or more embodiments, the orientations of the secondary flow channels 23a, 23b, 23c, 23d are different than the flow orientations of the feed flow channels 17 and the exit flow channels 18.

These flow channel arrays are repeated periodically throughout the flow field array to form a flow field structure without any dead ends, and thus, facilitate enhanced water drainage. The intersecting secondary flow channels 23a, 23b, 23c, 23d of adjacent flow channel arrays collectively form a single primary flow channel 24 having a flow orientation directed towards the outlet region to facilitate more uniform power generation, lower pressure drops throughout the FC 10, and removal of accumulated water in the oxygen channel and gas diffusion layer (GDL) under the ribs 16.

Figure 6:
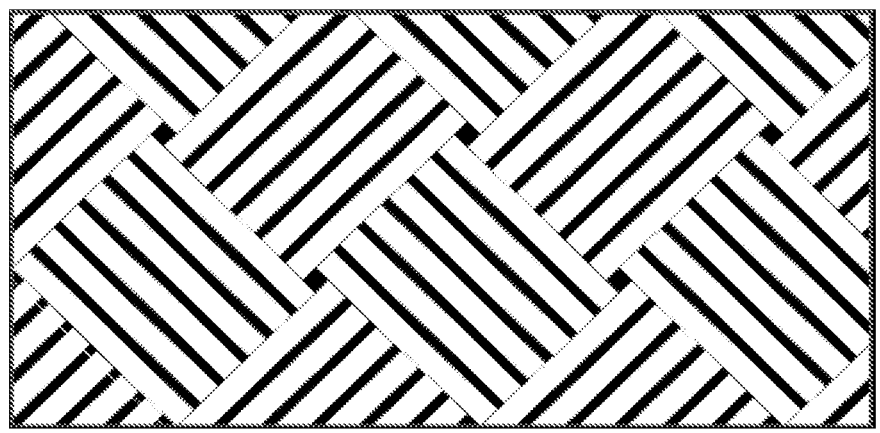
FIG. 6 illustrates an example interwoven pattern having an increased channel width when compared to the interwoven pattern of FIG. 5, in accordance with one or more embodiments shown and described herein.
Figure 7:
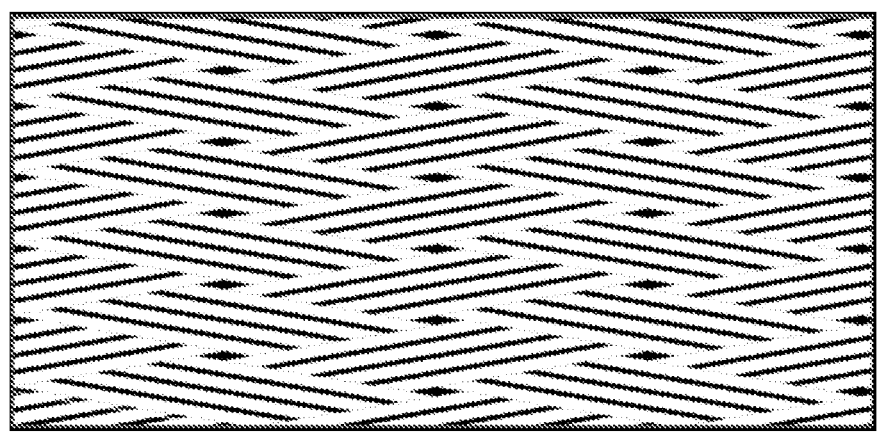
FIG. 7 illustrates an example interwoven pattern having a generally reduced angular orientation relative to a horizontal plane, in accordance with one or more embodiments shown and described herein.
Figure 8:
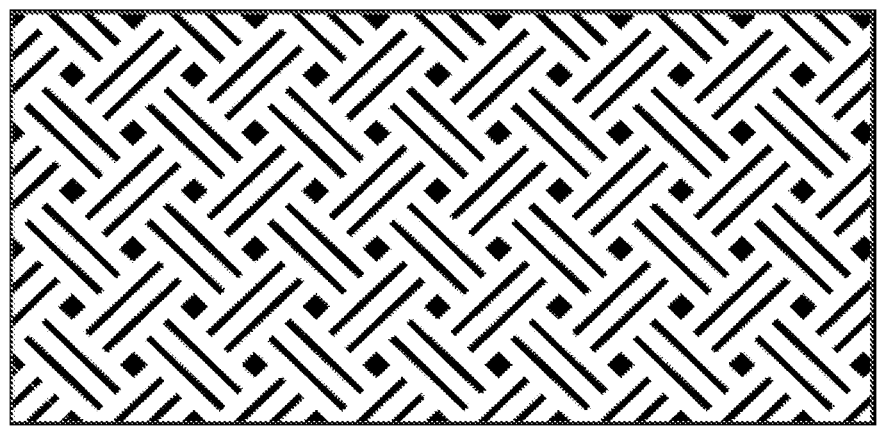
FIG. 8 illustrates an example interwoven pattern having an decreased channel length when compared to the interwoven pattern of FIG. 5, in accordance with one or more embodiments shown and described herein.

Distal ends of each, respective secondary flow channels 23a, 23b, 23c, 23d, are fluidically connected at different regions of the primary channel 24 to generate different pressure levels through the flow field. This pressure differential between branch channels or secondary flow channels 23a, 23b, 23c, 23d promotes or otherwise facilitates fluid flow through the electrode layer under the ribs 16 of the FC bipolar plate 14, 15. The pressure differential is adjustable by creating optimized flow field structures having varying channel widths 121 (FIG. 6), channel orientations 221 (FIG. 7) and/or channel lengths 321 (FIG. 8) for the secondary flow channels 23a, 23b, 23c, 23d and the corresponding primary channel 24 based on homogenized anisotropic porous media optimization (See, for example, FIGS. 2 and 3). In particular, when compared to the example flow field structure of FIG. 5, the example flow field structure of FIG. 6 has increased channel widths, the example flow field structure of FIG. 7 has channel that intersect at approximately an obtuse angle, and the example flow field structure of FIG. 8 has decreased channel widths.

Figure 9:
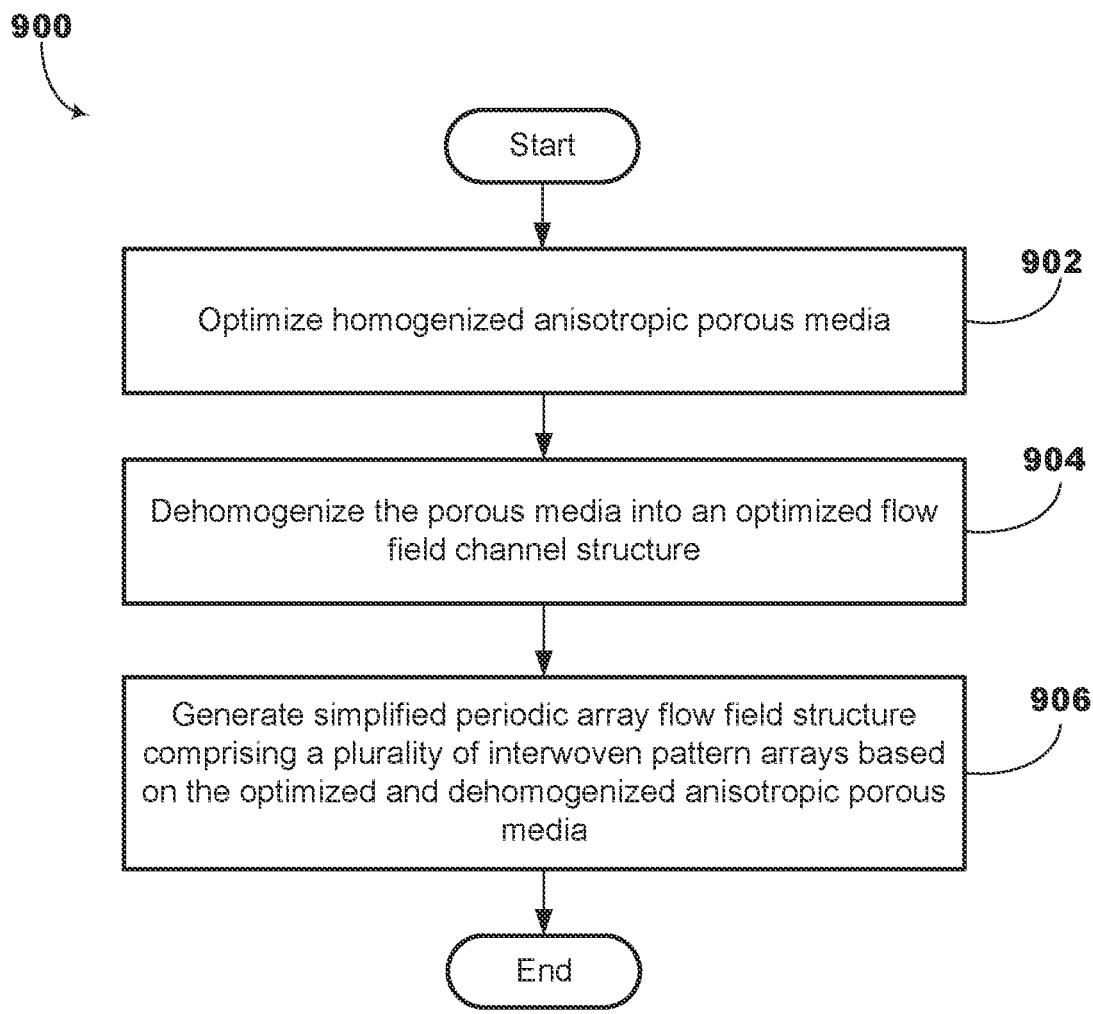
FIG. 9 illustrates a schematic diagram of an example of a method of designing a fluid flow field structure for an FC bipolar plate, in accordance with one or more embodiments shown and described herein.

FIG. 9 illustrates a flowchart of an example method 900 of designing a fluid flow field for an FC bipolar plate, in accordance with one or more embodiments. The method 900 is to yield an optimized design of a fluid flow field fuel configuration that minimizes pressure drop across the fuel cell, obtains uniform reaction performance across the FC, and minimizes water accumulation or saturation. Moreover, the method is to enhance overall thermal management and operational performance of the FC.

The flowchart of method 900 corresponds in whole or in part to the schematic illustrations of FIGS. 1 through 8 set forth and described herein. In accordance with embodiments, one or more process blocks set forth in the method 900 may be implemented, for example, using logic instructions (e.g., software), configurable logic, fixed-functionality hardware logic, etc., or any combination thereof. As an example, software executed on one or more computing systems may provide functionality described or illustrated herein. Each computing system respectively includes one or more processors. In particular, software executing on one or more computer systems may perform one or more fabrication or processing blocks of the method 900 set forth, described, and/or illustrated herein or provides functionality described or illustrated herein.

As illustrated in FIG. 9, in the method 900, illustrated processing block 902 includes optimizing, by one or more computing devices having one or more processors, homogenized anisotropic porous media by iteratively executing a gradient-based algorithm that incorporates objective functions of reaction variation and flow resistance.

The method 900 can then proceed to illustrated process block 904, which includes dehomogenizing the porous media into an optimized flow field channel structure.

The method 900 can then proceed to illustrated process block 906, which includes generating, based on the optimized and dehomogenized anisotropic porous media, a simplified flow field structure for a bipolar plate body comprising a plurality of parallel feed flow channels fluidically connected to an inlet bipolar plate region, a plurality of parallel exit flow channels fluidically connected to an outlet bipolar plate region, and an interwoven pattern formed by a plurality of flow channel arrays fluidically connected to the feed flow channels and the exit flow channels. The method 900 can then terminate or end after execution of process block 906.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the one or more embodiments can be implemented in a variety of forms. Therefore, while the embodiments are set forth, illustrated, and/or described in connection with particular examples thereof, the true scope of the embodiments should not be so limited since other modifications will become apparent to the skilled practitioner upon a study of the drawings, specification, and claims.

What is claimed is:

1. A bipolar plate for a fuel cell, the bipolar plate comprising:
   a bipolar plate body having an inlet bipolar plate region, an outlet bipolar plate region, and a simplified periodic array flow field structure comprising a plurality of parallel feed flow channels fluidically connected to the inlet bipolar plate region,
   a plurality of parallel exit flow channels fluidically connected to the outlet bipolar plate region, and
   an interwoven pattern flow field structure formed by a plurality of flow channel arrays fluidically connected to the feed flow channels and the exit flow channels, the interwoven pattern flow field structure having a structure based on flow patterns generated by homogenized anisotropic porous media optimization, wherein each flow channel array comprises a first flow channel subarray including a first plurality of parallel secondary flow channels that intersect a second plurality of parallel secondary flow channels and a third plurality of parallel secondary flow channels that is intersected by the second plurality of parallel secondary flow channels, wherein the third plurality of parallel secondary flow channels intersect a fourth plurality of parallel secondary flow channels, wherein the first and second plurality of parallel secondary flow channels are formed by linear ribs, wherein the first plurality of parallel secondary flow channels and the third plurality of parallel secondary flow channels are positioned to be parallel to one another, wherein at least a portion of the first plurality of parallel secondary flow channels is directly adjacent to the third plurality of parallel secondary flow channels, wherein at least a portion of the second plurality of parallel secondary flow channels is directly adjacent to the fourth plurality of parallel secondary flow channels, and wherein the first plurality of parallel secondary flow channels are located to be offset laterally and longitudinally with respect to the third plurality of parallel secondary flow channels and the second plurality of parallel secondary flow channels are located to be offset laterally and longitudinally with respect to the fourth plurality of parallel secondary flow channels.

2. The bipolar plate of claim 1, wherein the flow channel arrays are repeated or arrayed periodically throughout the flow field.

3. The bipolar plate of claim 1, wherein: the first plurality of parallel secondary flow channels have a first flow orientation and the second plurality of parallel secondary flow channels have a second flow orientation that is different from the first flow orientation, and the third plurality of parallel secondary flow channels have a third flow orientation and the fourth plurality of parallel secondary flow channels have a fourth flow orientation that is different from the third flow orientation.

4. The bipolar plate of claim 3, wherein the first flow channel subarray and the second flow channel subarray are fluidically connected to each other to define a single primary flow channel having a flow orientation directed towards the outlet bipolar plate region.

5. The bipolar plate of claim 1, wherein the flow channel arrays have flow orientations that are different from the flow orientations of the feed flow channels and the exit flow channels.

6. A bipolar plate fuel cell, comprising:
a multi-layer electrolyte structure interposed between a pair of bipolar plates, each fuel cell bipolar plate comprising a bipolar plate body having an inlet bipolar plate region, an outlet bipolar plate region, and a simplified periodic array flow field structure comprising a plurality of parallel feed flow channels fluidically connected to the inlet bipolar plate region,
a plurality of parallel exit flow channels fluidically connected to the outlet bipolar plate region, and
an interwoven pattern flow field structure formed by a plurality of flow channel arrays fluidically connected to the feed flow channels and the exit flow channels, the interwoven pattern flow field structure having a structure based on flow patterns generated by homogenized anisotropic porous media optimization, wherein each flow channel array comprises a first flow channel subarray including a first plurality of parallel secondary flow channels that intersect a second plurality of parallel secondary flow channels and a third plurality of parallel secondary flow channels that is intersected by the second plurality of parallel secondary flow channels, wherein the third plurality of parallel secondary flow channels intersect a fourth plurality of parallel secondary flow channels, wherein the first and second plurality of parallel secondary flow channels are formed by linear ribs, wherein the first plurality of parallel secondary flow channels and the third plurality of parallel secondary flow channels are positioned to be parallel to one another, wherein at least a portion of the first plurality of parallel secondary flow channels is directly adjacent to the third plurality of parallel secondary flow channels, wherein at least a portion of the second plurality of parallel secondary flow channels is directly adjacent to the fourth plurality of parallel secondary flow channels, and wherein the first plurality of parallel secondary flow channels are located to be offset laterally and longitudinally with respect to the third plurality of parallel secondary flow channels and the second plurality of parallel secondary flow channels are located to be offset laterally and longitudinally with respect to the fourth plurality of parallel secondary flow channels.

7. The bipolar plate fuel cell of claim 6, wherein the flow channel arrays are repeated or arrayed periodically throughout the flow field.

8. The bipolar plate fuel cell of claim 6, wherein: the first plurality of parallel secondary flow channels have a first flow orientation and the second plurality of parallel secondary flow channels have a second flow orientation that is different from the first flow orientation, and the third plurality of parallel secondary flow channels have a third flow orientation and the fourth plurality of parallel secondary flow channels have a fourth flow orientation that is different from the third flow orientation.

9. The bipolar plate of claim 8, wherein the first flow channel subarray and the second flow channel subarray are fluidically connected to each other to define a single primary flow channel having a flow orientation directed towards the outlet bipolar plate region.

10. The bipolar plate fuel cell of claim 6, wherein the flow channel arrays have flow orientations that are different from the flow orientations of the feed flow channels and the exit flow channels.

* * * * *